(12) United States Patent
Masaki et al.

(10) Patent No.: US 8,167,728 B2
(45) Date of Patent: May 1, 2012

(54) DAMPER DISK ASSEMBLY AND FLYWHEEL ASSEMBLY

(75) Inventors: Michimoto Masaki, Neyagawa (JP); Takashi Harada, Shijyonawate (JP); Hiroshi Uehara, Hirakatashi Osaka (JP)

(73) Assignee: EXEDY Corporation, Osaka (JP)

( * ) Notice: Subject to any disclaimer, the term of this patent is extended or adjusted under 35 U.S.C. 154(b) by 1151 days.

(21) Appl. No.: 11/916,517

(22) PCT Filed: May 29, 2006

(86) PCT No.: PCT/JP2006/310627
§ 371 (c)(1),
(2), (4) Date: Dec. 4, 2007

(87) PCT Pub. No.: WO2006/132101
PCT Pub. Date: Dec. 14, 2006

(65) Prior Publication Data
US 2009/0223771 A1 Sep. 10, 2009

(30) Foreign Application Priority Data
Jun. 6, 2005 (JP) ................................. 2005-165850

(51) Int. Cl.
*F16F 15/129* (2006.01)
(52) U.S. Cl. .................................................. 464/68.41
(58) Field of Classification Search ................ 464/68.4, 464/68.41; 192/213.21, 213.22, 213.3, 213.31, 192/214, 214.1
See application file for complete search history.

(56) References Cited

U.S. PATENT DOCUMENTS

| 4,924,728 | A | 5/1990 | Mori |
| 5,655,967 | A | 8/1997 | Lopez et al. |
| 6,612,933 | B2 * | 9/2003 | Uehara ...................... 464/68.41 |
| 2003/0226734 | A1 | 12/2003 | Uehara |
| 2004/0082392 | A1 * | 4/2004 | Fukushima et al. ......... 464/68.4 |

FOREIGN PATENT DOCUMENTS

| JP | 01-238768 A | 9/1989 |
| JP | 2004-060882 A | 2/2004 |

* cited by examiner

*Primary Examiner* — Gregory Binda
(74) *Attorney, Agent, or Firm* — Global IP Counselors, LLP (57) ABSTRACT

To accomplish a superior characteristic for absorbing and damping torsional vibrations in a damper disk assembly and a flywheel assembly. A damper disk assembly includes a pair of plates 11 and 12, a flange 20, coil springs 16 and 17, and friction plates 58 and 59. The pair of plates 11 and 12 is fixed to each other. The flange 20 is disposed between the pair of plates 11 and 12 in the axial direction. The coil springs 16 and 17 elastically couple the pair of plates 11, 12 and flange 20 in the rotational direction. The friction plates 58 and 59 are disposed to operate in parallel with the coil springs 16 and 17 between the pair of plates 11, 12 and the flange 20 in the rotational direction, frictionally engage with the pair of plates 11 and 12, and engage with the flange 20 to be relatively rotatable in only range of the small torsional angle.

13 Claims, 8 Drawing Sheets

DAMPER DISK ASSEMBLY AND FLYWHEEL ASSEMBLY

TECHNICAL FIELD

The present invention relates to a damper disk assembly and a flywheel assembly for transmitting torque and for absorbing and damping torsional vibrations.

BACKGROUND ART

Clutch disk assemblies used in vehicles function as a clutch for engaging and disengaging a flywheel. Clutch disk assemblies also function as a damper mechanism for absorbing and damping torsional vibrations from the flywheel. In general, vehicle vibrations include idling-related noises such as rattling sounds, traveling-related noises such as rattling associated with acceleration and deceleration and muffled noises, and tip-in/tip-out (low frequency vibrations). The damper function of the clutch disk assembly is provided ideally to eliminate these noises and vibrations.

Idling-related noises are rattling noises that emit from the transmission while the gearshift is put into neutral and the clutch pedal is released, for example, while waiting at a traffic light. In the engine idling rotational speed, the engine torque is relatively low and the torque fluctuations at the time of each power stroke explosion is relatively large. Under these conditions, the teeth of the input gear and counter gear in the transmission undergo a phenomenon of striking against one another.

Tip-in and tip-out or low frequency vibrations refer to large-scale lengthwise shaking of the vehicle that occurs when the accelerator pedal is depressed or released suddenly. If the rigidity of the drive transmission system is low, the torque transmitted to the tires is transmitted back from the tires as torque and a resulting lurching reaction causes excessive torque to be generated at the tires. As a result, longitudinal vibrations occur that shake the vehicle excessively back and forth.

In the case of idling noises, since the problem lies in the zero torque region of the torsion characteristic of the clutch disk assembly, the torsional rigidity is preferably low in the region. Conversely, it is necessary for the torsion characteristic of the clutch disk assembly to be as rigid as possible to suppress the longitudinal vibrations caused by tip-in and tip-out.

In order to solve this problem, a clutch disk assembly has been proposed that has a two-stage characteristic obtained by using two types of springs. The first stage or low torsional angle region of the torsion characteristic has a relatively low torsional rigidity and low hysteresis torque, and provides a noise preventing effect during idling. Meanwhile, the second stage or high twisting angle region of the torsion characteristic has a relatively high torsional rigidity and high hysteresis torque. Thus, the second stage is sufficiently capable of damping the longitudinal vibrations of tip-in and tip-out.

A damper mechanism that efficiently absorbs small torsional vibrations has also been known. The damper mechanism is configured to have a low hysteresis torque in the second stage of the torsion characteristic and does not allow a high friction mechanism of the second stage to operate when small vibrations are inputted due to such factors as combustion fluctuations in the engine.

There has also been known a flywheel assembly that configures a torsional vibrations damping system that is divided by the input and output sides so that the damper mechanism is the border, in combination with the damper mechanism.

The flywheel assembly is made up of an input side first flywheel, an output side second flywheel, and a damper mechanism for elastically coupling the both flywheels in a rotational direction, for example. The damper mechanism includes a plurality of coil springs, and further includes a friction generating mechanism or a viscous resistance generating mechanism. A clutch cover assembly is attached in the second flywheel, and a friction coupling portion of the clutch disk assembly is disposed between a friction surface of the second flywheel and a pressing surface of a pressure plate. The clutch disk assembly is coupled to an input shaft of the transmission.

There has been known a flywheel assembly directly outputting torque to the input shaft of the transmission without the clutch cover assembly and the clutch disk assembly along the path. The flywheel assembly has a damper mechanism that is the same as that of the clutch disk assembly, and a hub is coupled to the input shaft. A flywheel is fixed to at least one of the input member and output member of the damper mechanism.

DISCLOSURE OF THE INVENTION

Problems to be Solved by the Invention

However, in the conventional damper mechanism, which does not allow the high friction generating mechanism to operate in the second stage when the small torsional vibrations due to such factors as combustion fluctuations in the engine is inputted, since an urging member for applying an urging force to the friction surfaces of the low and high friction generating mechanisms is shared, replacing the urging member to change the hysteresis torque generated in the low friction generating mechanism causes the hysteresis torque generated in the high friction generating mechanism to vary. Accordingly, the hysteresis torque is difficult to adjust.

It is an object of the present invention to accomplish a superior characteristic for absorbing and damping torsional vibrations in a damper disk assembly and a flywheel assembly.

Means for Solving Problems

A damper disk assembly according to a first aspect of the present invention includes a pair of first and second plate-like rotating members, a third plate-like rotating member, an elastic member, and a friction plate. The pair of first and second plate-like rotating members is fixed to each other. The third plate-like rotating member is disposed between the pair of first and second plate-like rotating members in an axial direction. The elastic member elastically couples the pair of first and second plate-like rotating members and the third plate-like rotating member in a rotational direction. The friction plate is disposed to operate in parallel with the elastic member between the pair of first and second plate-like rotating members and the third plate-like rotating member in the rotational direction, frictionally engages with the pair of first and second plate-like rotating members, and engages with the third plate-like rotating member to be relatively rotatable in only range of the small torsional angle.

With this damper disk assembly, when the pair of first and second plate-like rotating members and the third plate-like rotating member relatively rotates, the elastic member is compressed in the rotational direction. Moreover, the friction plate slides with the first and second rotating members. Since the friction plate rotates relative to the third plate-like rotating member with respect to the small torsional vibrations, the friction plate does not slide with the first and second plate-like rotating members. Accordingly, the friction plate does not generate friction with respect to the small torsional vibrations.

The damper disk assembly according to a second aspect of the present invention is the damper disk assembly of the first aspect, wherein the third plate-like rotating member includes a hole penetrating in the axial direction. The friction plate includes a body disposed between the second plate-like rotating member and the third plate-like rotating member in the axial direction and a projection disposed in the hole to secure a small clearance in the rotational direction. The hole may have a round shape, a circumferentially highly elliptical shape, or an oval shape.

With this damper disk assembly, the friction plate does not slide with the first and second plate-like rotating members in the range in which the projections of the friction plate does not collide with a portion that helps to define the hole of the third plate-like rotating member.

The damper disk assembly according to a third aspect of the present invention is the damper disk assembly of the second aspect, and further includes a friction member engaging with the first plate-like rotating member to be non-rotatable and axially movable relative thereto and having a friction surface on the projection side, and an urging member urging the friction member toward the projection.

With this damper disk assembly the friction plate does not slide with the friction member in the range in which the projection of the friction plate does not collide with a portion that helps to define the hole of the third plate-like rotating member.

The damper disk assembly according to a fourth aspect of the present invention is the damper disk assembly of the third aspect, and further includes a plate-like member attached to the end of the projection to be relatively non-rotatable. The friction member is pressed against the plate-like member.

With this damper disk assembly, in the range in which the projection of the friction plate does not collide with a portion that helps to define the hole of the third plate-like rotating member, the plate-like member does not slide with the friction member.

The damper disk assembly according to a fifth aspect of the present invention is the damper disk assembly of any one of the first to fourth aspects, wherein the friction plate positions the first and second plate-like rotating members with respect to the other members in the radial direction.

With this damper disk assembly, the number of members is reduced, and the overall structure is simplified.

The damper disk assembly according to a sixth aspect of the present invention is the damper disk assembly of any one of the first to fourth aspects of the present invention, wherein the friction plate has a cylindrical portion having an outer periphery surface with which an inner periphery edge of the second plate-like rotating member contacts and an inner periphery surface contacting with an outer periphery surface of the other member.

With this damper disk assembly, the cylindrical portion of the friction plate centrally positions the second plate-like rotating member with respect to the other member.

The flywheel assembly according to a seventh aspect of the present invention is a device for transmitting torque from a crankshaft of an engine to an input shaft of a transmission, and includes a flywheel, a damper mechanism, and friction generating mechanism. Torque is inputted from the crankshaft to the flywheel. The damper mechanism includes a pair of plate-like rotating members fixed to each other and coupled to the flywheel, a hub having a flange disposed between the pair of plate-like rotating members in the axial direction and outputting torque to the input shaft, and an elastic member being compressed in the rotational direction when the pair of plate-like rotating members and the flange relatively rotate. When the pair of plate-like rotating members and the flange relatively rotate, the friction generating mechanism generates friction and does not generate the friction with respect to the torsional vibrations in the range of the small torsional angle.

In this flywheel assembly, torque is transmitted from the flywheel to the damper mechanism, and is further transmitted to the input shaft. In the damper mechanism, torque is transmitted from the pair of plate-like members to the hub via the elastic member. In the damper mechanism, when the torsional vibrations from the flywheel, the pair of plate-like rotating members and the flange relatively rotate, and the elastic member is compressed in the rotational direction. Moreover, the friction generating mechanism generates the friction. The friction generating mechanism does not generate the friction with respect to the small torsional vibrations.

The flywheel assembly according to an eighth aspect of the present invention is the flywheel assembly of the seventh aspect, wherein the friction generating mechanism is disposed to operate in parallel with the elastic member between the pair of plate-like rotating members and the flange in the rotational direction, and includes a friction plate frictionally engaging with one of the pair of plate-like rotating members and the flange and engaging with other of them to be relatively rotatable in only the range of the small torsional angle.

With this flywheel assembly, for example, since the friction plate rotates relative to the flange with respect to the small torsional vibrations, the friction plate does not slide with the pair of plate-like rotating members. Accordingly, the friction plate does not generate with respect to the small torsional vibrations.

Effect of the Invention

With the damper disk assembly and the flywheel assembly according to the present invention, since a high amount of friction is not generated with respect to small torsional vibrations, the small torsional vibrations can be effectively damped.

BRIEF DESCRIPTION OF THE DRAWINGS

Referring now to the attached drawings which form a part of this original disclosure.

NUMERICAL REFERENCES 1 flywheel assembly
2 flywheel
3 damper mechanism
11 plate (first plate-like rotating member)
12 plate (second plate-like rotating member)
16 coil springs (elastic member)
17 coil springs (elastic member)
19 hub
20 flange (third plate-like rotating member)
40 friction generating mechanism
50 low friction generating mechanism
51 first bush
52 first disc spring
55 high friction generating mechanism
56 second bush (friction member)
57 second disc spring (urging member)
58 third bush (friction plate)
59 plate member

BEST MODE FOR CARRYING OUT THE INVENTION

(1) Overall Structure

Figure 1:
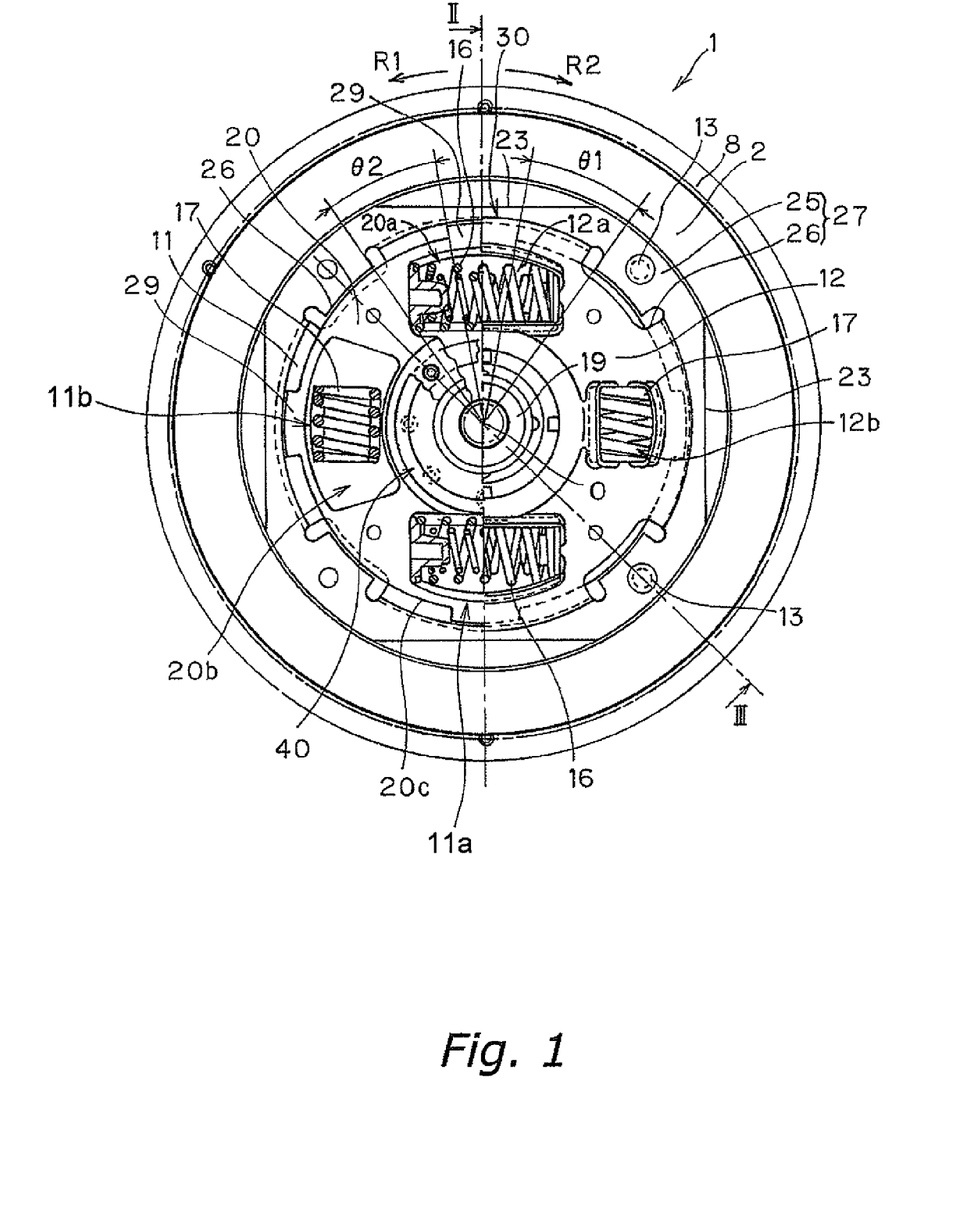
FIG. 1 is a plane view of a flywheel assembly (first embodiment)
Figure 2:
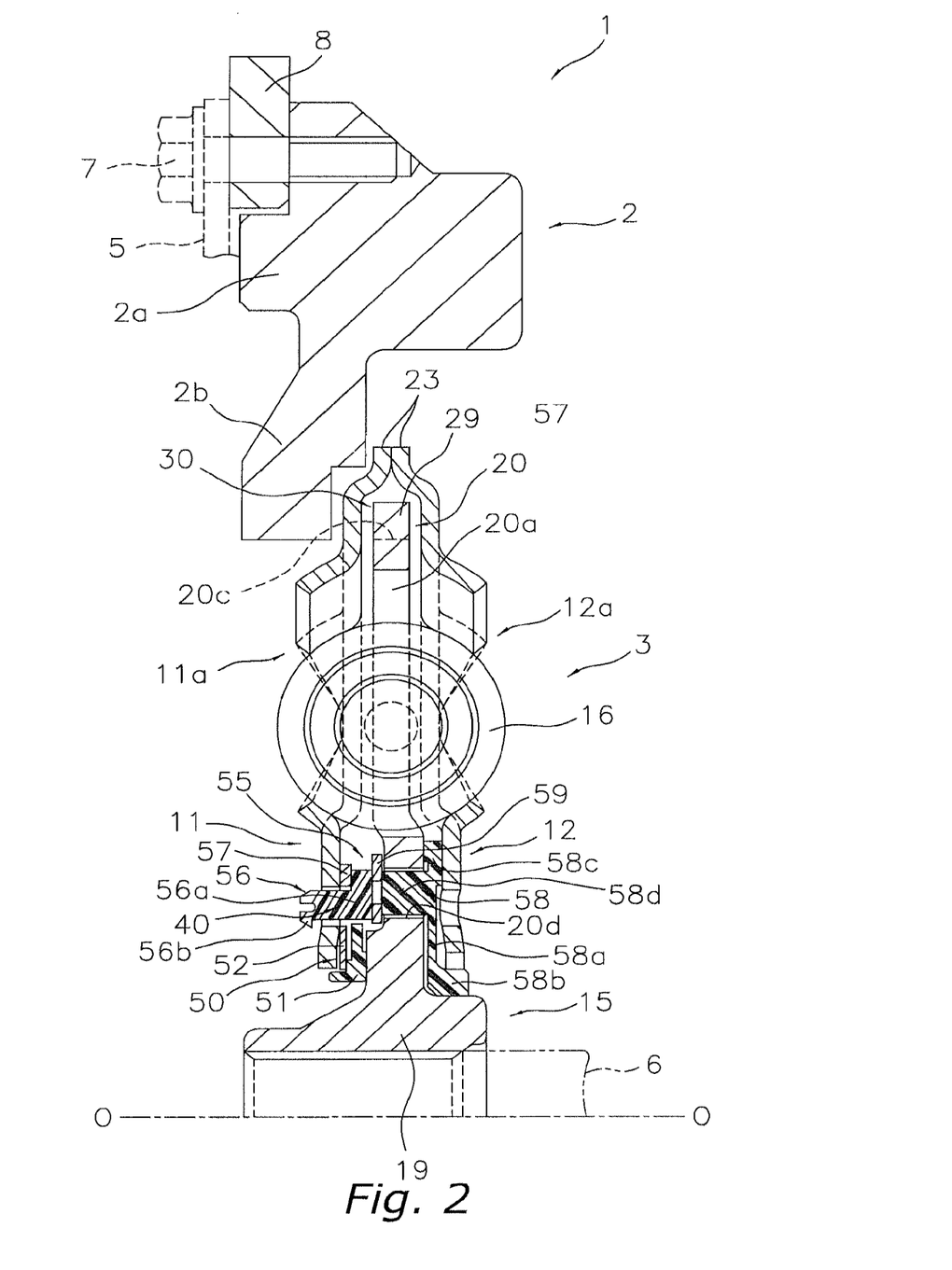
FIG. 2 is a longitudinal cross-sectional view of the flywheel assembly (first embodiment)
Figure 3:
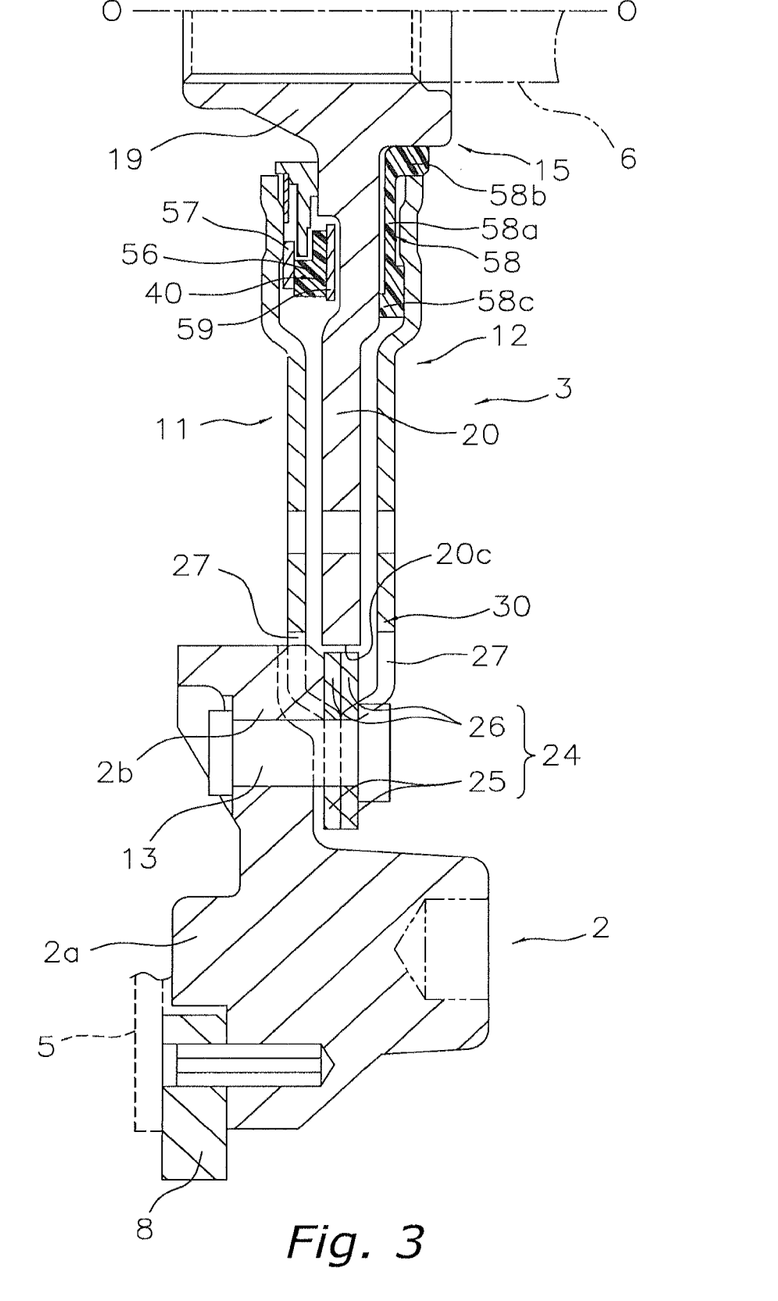
FIG. 3 is a longitudinal cross-sectional view of the flywheel assembly (first embodiment)

FIGS. 1 to 3 show a flywheel assembly 1 according to a preferred embodiment of the present invention. The flywheel assembly 1 is a mechanism for transmitting torque from a crankshaft (not shown) of an engine to a transmission (not shown). In FIG. 1, the arrow R1 indicates the positive rotational direction of the flywheel assembly, and the arrow R2 indicates the negative rotational direction. FIGS. 2 and 3 are longitudinal cross-sectional views of the flywheel assembly 1, and the engine is disposed to the left of the flywheel assembly 1 and the transmission is disposed to the right of the flywheel assembly 1. Moreover, line O-O in FIGS. 2 and 3 represents a rotational axis of the flywheel assembly 1.

More specifically, the flywheel assembly 1 is a device which receives torque from a flexible plate 5 and outputs torque to an input shaft 6 of the transmission, and is mainly made up of a flywheel 2 and a damper mechanism 3. In the below description, "axial direction," "rotational (circumferential) direction," and "radial direction" mean each direction in the damper mechanism 3 serving as the rotating member unless otherwise noted.

(2) Flywheel

The flywheel 2 is a annular member disposed radially outwardly. The flywheel 2 is a member having generally large thickness (length in the axial direction), and generates the large inertia moment in the flywheel assembly 1. Specifically, the flywheel 2 is made up of an outer portion 2a having large thickness and an inner portion 2b having small thickness. The outer portion of the flexible plate 5 is fixed via a plurality of bolts 7 and an annular plate 8 on the engine side surface of outer portion 2a in the axial direction. An input part of a damper mechanism 3 is fixed on the axial transmission side of the inner portion 2b (described below).

(3) Damper Mechanism

The damper mechanism 3 is a mechanism for transmitting torque and for absorbing and damping torsional vibrations. The damper mechanism 3 mainly includes a pair of disk-like plates 11 and 12 fixed to each other, a hub 15, and a plurality of coil springs 16 and 17. The hub 15 has a flange 20 disposed between the pair of disk-like plates 11 and 12 and outputs torque to the input shaft 6. The plurality of coil springs 16 and 17 are disposed between the pair of disk-like plates 11 and 12 and the flange 20 in the rotational direction, and are compressed in the rotational direction when the pair of disk-like plates 11 and 12 and the flange 20 relatively rotate.

1) Disk-like Plate

The pair of disk-like plates 11 and 12 is made of disk-like annular thin plate, and are disposed to be opposed to each other in the axial direction. In this embodiment, the pair of disk-like plates 11 and 12 has the same shapes and are compatible. The disk-like plate 11 has a pair of first window portions 11a and a pair of second window portions 11b. The pair of first window portions 11a are opposed in the radial direction (vertical direction in FIG. 1), and the pair of second window portions 11b are opposed in the radial direction (horizontal direction in FIG. 1). The first window portions 11a and second window portions 11b are made up of holes penetrating in the axial direction and raised portions. The raised portions are raised axially outwardly in the edge of the hole. The second window portions 11b are set to be shorter than the first window portions 11a in the rotational direction. Similarly, the disk-like plate 12 has first window portions 12a and second window portions 12b.

Fixing portions 24 for the disk-like plate 11 and disk-like plate 12 and rivets 13 will be described. Straight portions 23 are formed at the outer periphery edge of the disk-like plate 11 so that a part of a circle is cut at four points in the rotational direction. Fixing portions 24 are formed between the straight portions 23 in the rotational direction. The fixing portion 24 is mainly made up of an outer portion 25 and a first projection 26 extending radially inwardly therefrom. The outer portion 25 is a portion that further extending radially outwardly relative to the flange 20, and a flat plate-like portion disposed on the axial transmission side of the plate body portion (on the disk-like plate 12 side). The first projection 26 is a projection extending radially from the inner periphery edge of the outer portion 25, and has a specific width in the rotational direction. As shown in FIG. 3, the first projection 26 is continuously formed on the same plane as the outer portion 25. Cutout 27 is formed around the first projection 26 (radially inward direction and opposite rotational direction). This cutout 27 separates the first projection 26 from the surrounding portion. Inner surface 26a and opposite rotational surfaces 26b of the first projections 26 have plate-like cross-sections.

Similarly, the outer portions 25, the first projections 26, and the cutouts 27 are formed on or in the disk-like plate 12. The outer portions 25 and the first projections 26 of the disk-like plates 11 and 12 contact with each other in the axial direction. Moreover, the outer portions 25 and the first projections 26 of the disk-like plate 11 contact with the axial transmission side surface of the inner portion 2b of the flywheel 2. In this state, rivets 13 are disposed to pass through holes respectively formed in the flywheel 2 and the plate 11 and 12. The head portion of the rivet 13 is larger than the body portion, and the rivets 13 prevent the members from separating in the axial direction. In the outer portion 25 and the first projections 26, the position of the holes through which the rivets 13 pass (the position of the rivet 13) is the center of the first projection 26 in the rotational direction and is disposed radially inward of the outer portions 25 (on the first projections 26 side). As described above, the outer portion 25 and the first projections 26 serve as the fixing portion 24 of the rivets 13.

2) Hub

The hub 15 is made up of a cylindrical boss 19 and a flange 20 extending radially outwardly from the outer peripheral surface thereof. The boss 19 is disposed inside the center hole of the plates 11 and 12, and a spline hole to which the input shaft 6 is splined is formed with the boss 19. The flange 20 is disposed between the plates 11 and 12 in the axial direction. First window openings 20a, which correspond to the first window portions 11a and 12a of the plates 11 and 12, and second window openings 20b, which corresponds to the second window portions 11b, 12b of the plates 11 and 12, are formed in the flange 20. The first window openings 20a have substantially the same shapes as the first window portions 11a and 12a. The second window openings 20b are longer than the second window portions 11b and 12b in the rotational direction, thereby the second window openings 20b further extend relative to the second window portions 11b and 12b in the opposite rotational direction.

Second projections 29 projecting radially outwardly are formed on the outer periphery edge 20c of the flange 20. The positions of the second projections 29 in rotational direction correspond to window openings 20a and 20b, and are arranged between the first projections 26 of the plates 11 and 12 in the rotational direction. As shown in FIG. 2, the second projections 29 are formed on the same plane as the body part. The second projections 29 have a specific width in the rotational direction. Since the rotational end faces of the first projections 26 and the second projections 29 are disposed at the same rotational positions, increasing the torsional angle between the plates 11, 12 and the flange 20 causes the end faces to collide with each other. As a result, the plates 11, 12 and the flange 20 are prevented from relatively rotating. As described above, the torsional angle stopper 30 for stopping the relative rotation between the pair of disk-like plates 11, 12 and the hub 15 is defined by the part of the disk-like plate 11, 12 and the part of the flange 20.

Figure 4:
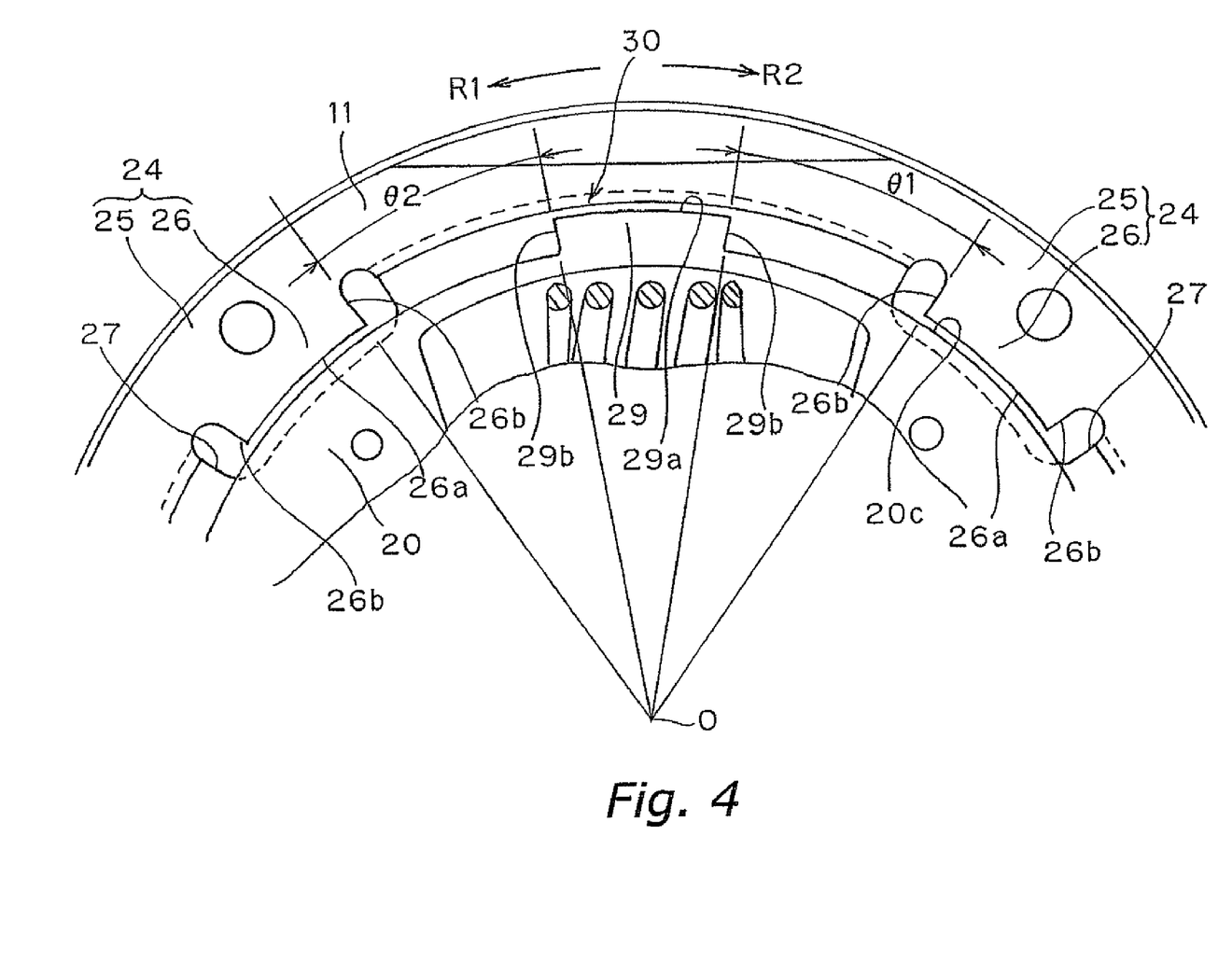
FIG. 4 is a partial plane view of the flywheel assembly (first embodiment)
Figure 5:
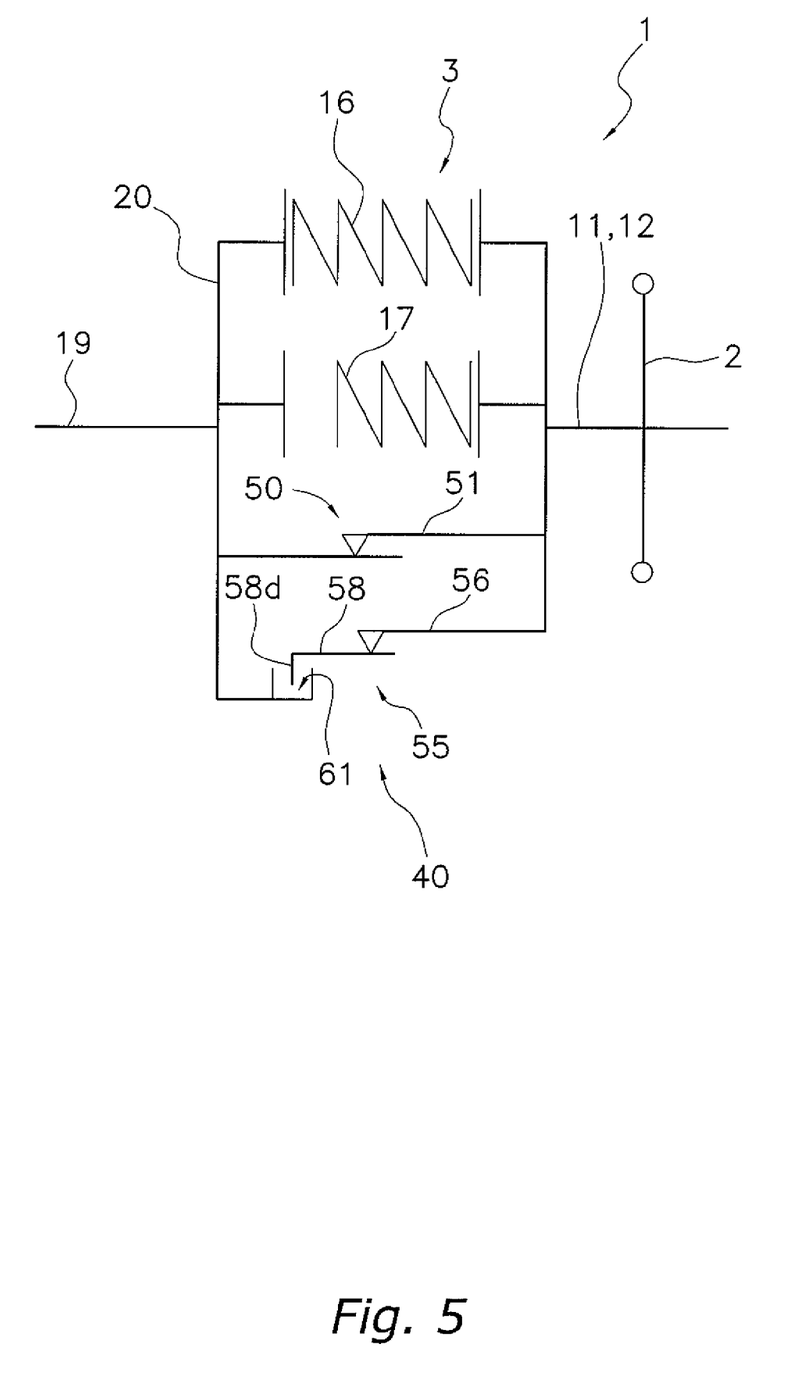
FIG. 5 is a mechanical schematic diagram of the flywheel assembly (first embodiment)

With reference to FIG. 4, the torsional angle stopper 30 will be further described in detail. When seen from the second projections 29 side, the clearance corresponding to the torsional angle θ2 is secured between the second projection 29 and the first projection 26 disposed on the rotational R1 side thereof in the rotational direction, and a clearance for the torsional angle θ1 is secured between the second projection 29 and the first projection 26 disposed on the rotational R2 side in the rotational direction. The surrounding of the first projection 26 is made up of the inner periphery surface 26a and the opposite rotational side surface 26b having the plate-like cross-sections. The inner periphery surface 26a of the first projections 26 is radially adjacent to the outer periphery edge 20c of the flange 20. The surrounding of the second projection 29 is made up of the outer periphery surface 29a and the opposite rotational side surfaces 29b having the plate-like cross-sections. The second projection 29 radially outwardly extends from the outer periphery edge 20c, and is radially outwardly disposed relative to the inner periphery surface 26a of the first projections 26. As a result, the rotational side surface 26b of the first projections 26 and the rotational direction side surface 29b of the second projections 29 correspond to each other in the axial and radial directions, and are configured to contact with each other when increasing the torsional angle between the plates 11, 12 and the flange 20. In particular, the first projections 26 are formed by contacting the plates 11 and 12, and have the same thickness as the second projections 29. Accordingly, since the area in the contacting portion of the torsional angle stopper 30 is sufficiently secured, the contacting portion is difficult to be broken and worn away.

3) Coil Springs

The first coil springs 16 are disposed in the space defined by the first window portions 11a, 12a and the first window openings 20a. The first coil spring 16 is a parent-child spring made up of two kinds of coil springs, and the opposite rotational ends thereof contact with or are adjacent to the first window portions 11a, 12a and the first window openings 20a. The second coil springs 17 is disposed in the space defined by the second window portions 11b, 12b and the second window openings 20b. The opposite rotational ends of the second coil springs 17 contact with the second window portions 11b and 12b, and are separated from the second window openings 20b in the rotational direction.

4) Friction Generating Mechanism

A friction generating mechanism 40 made up of a plurality of plates and springs is disposed in the clearance between the inner portion of the plates 11, 12 and the inner portion of the flange 20. The friction generating mechanism 40 is a mechanism for generating predetermined friction, that is hysteresis torque, when the plates 11, 12 and the hub 15 relatively rotate.

The friction generating mechanism 40 has a low friction generating mechanism 50 and a high friction generating mechanism 55. The low friction generating mechanism 50 is disposed to operate in parallel with the springs 16 and 17 between the flange 20 and the plates 11 and 12 in the rotational direction, and is a mechanism for constantly generating low friction during operation of the damper mechanism 3.

The low friction generating mechanism 50 has a first bush 51 and a first disc spring 52. The first bush 51 is disposed between the flange 20 and the plate 11 in the axial direction, and contacts with the axial engine side surface of the flange 20. The first bush 51 engages to be movable in the axial direction and to be non-movable in the rotational direction relative to the plate 11. The first disc spring 52 is compressed between the plate 11 and the first bush 51 in the axial direction, and urges the first bush 51 toward the flange 20.

The high friction generating mechanism 55 is disposed to operate in parallel with the coil springs 16 and 17 between the flange 20 and the plates 11 and 12 in the rotational direction, and is a mechanism that generates high friction during operation of the damper mechanism 3 and does not generate the high friction with respect to small torsional vibrations. The high friction generating mechanism 55 has a second bush 56, a second disc spring 57, and a third bush 58. The body 56a of the second bush 56 is disposed radially outward of the first bush 51, and contacts with the axial engine side surface of the flange 20. The second bush 56 engages to be movable in the axial direction and to be non-movable in the rotational direction relative to the plate 11. Specifically, the second bush 56 has projections 56b axially extending from body 56a toward the engine and engaging with the hole of the plate 11. The second disc spring 57 is compressed between the plate 11 and the second bush 56 in the axial direction, and urges the second bush 56 toward the flange 20.

The third bush 58 is disposed between the flange 20 and the plate 12. The third bush 58 is an annular and disk-like body 58a. A cylindrical portion 58b axially extending toward the transmission is formed with the inner periphery edge of the body 58a. The inner periphery surface of the plate 12 contacts with the outer periphery surface of the cylindrical portion 58b to be supported. That is to say, the plate 12 is rotatable relative to the third bush 58. The inner periphery surface of the cylindrical portion 58b contacts with the outer periphery surface of the boss 19 of the hub 15 to be supported. That is to say, the third bush 58 is rotatable relative to the hub 15. As described above, the plate 12 is radially supported (centrally positioned with respect to the hub 15 via the third bush 58). Accordingly, the number of members is reduced, and the overall structure is simplified. A contacting portion 58c axially contacting with the flange 20 and the plate 12 is formed with the outer periphery edge of the body 58a.

Figure 6:
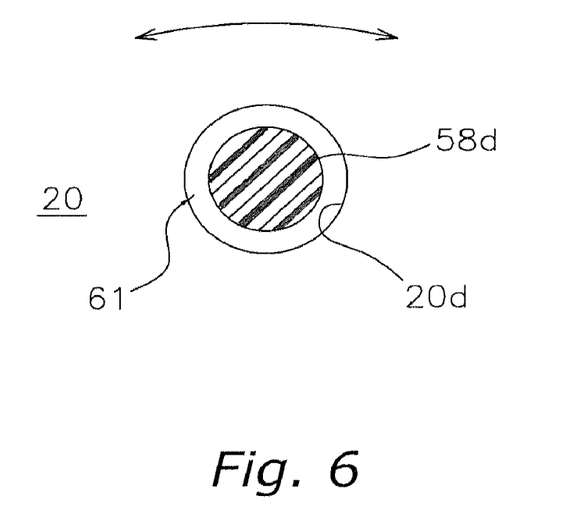
FIG. 6 is a partial plane view of a flange (first embodiment)

A plurality of holes 20d aligned in a circumferential direction is formed with the flange 20. The holes 20d penetrate in the axial direction and have a round shape. The third bush 58 has a plurality of projections 58d axially extending toward the engine to pass through the holes 20d. As shown in FIG. 6, since the projection 58d is formed to be smaller than the hole 20d, the small clearance 61 is secured between the projection 58d and the hole 20d in the rotational direction. The circumferential angle is so configured that high hysteresis is not generated with respect to torque torsional vibrations due to the rotational fluctuations of the engine and thereby reduction of the muffled noises is accomplished. More specifically, the circumferential angle is in or slightly beyond the range of 0.1 to 5 degrees. The holes 20d may have a highly elliptical or an oval shape other than a round shape. In this case, the circumferential angle of the small clearance can be larger than the round shape.

The end of the projections 58d further extend with respect to the axial engine side surface of the flange 20, and an annular and disk-like plate 59 is disposed in the end surface. The plate 59 engages with the projections 58d to be non-rotatable relative thereto. That is to say, the third bush 58 and the plate 59 are members integrally rotating. As described above, the second bush 56 is pressed against the plate 59 by the second disc spring 57.

The elastic force of the second disc spring 57 is larger than that of the first disc spring 52. The friction coefficient of the second bush 56 is same as or larger than that of the first bush 51. Accordingly, the high friction generating mechanism 55 generates a higher hysteresis torque than that of the low friction generating mechanism 50.

As described above, the third bush 58 and the plate 59 are disposed to operate in parallel with the coil springs 16 and 17 between the plates 11, 12 and the flange 20 in the rotational direction, frictionally engage with the plates 11 and 12 (the second bush 56), and engage with the flange 20 to be rotatable in only the range of the small torsional angle.

The bush 51, 56 and 58 described above is made of resin, and the plate 59 is made of metal such as steel.

(4) Operation

Torque from the crankshaft of the engine is inputted from the flexible plate 5 to the flywheel assembly 1, as a result, the flywheel assembly 1 and the input shaft 6 rotate. Specifically, torque is transmitted in the order of the flywheel 2, the disk-like plate 11, 12, the coil springs 16, 17, and the hub 15.

For example, when the combustion fluctuations of the engine are inputted to the flywheel assembly 1, the disk-like plates 11, 12 and the hub 15 relatively rotate, and the coil springs 16 and 17 are repeatedly compressed. At the same time, the friction generating mechanism 40 generates friction (described hereinafter). As a result, in the damper mechanism 3 of the flywheel assembly 1, torsional vibrations are sufficiently absorbed and damped. With regard to the torsional characteristic, since only the first coil springs 16 are compressed in the region which torsional angle is smaller, the characteristic having relatively lower rigidity is obtained. Since the first coil springs 16 and the second coil springs 17 are compressed in parallel in the region in which the torsional angle is larger, the characteristic having relatively higher rigidity is obtained.

Increasing the torsional angle between the disk-like plate 11, 12 and the hub 15 causes the rotational side surfaces of the first projections 26 and the second projections 29 to collide with each other. Accordingly, the torsional angle stopper 30 operates to stop the relative rotation of the both members.

(5) Function and Effect of Torsional Angle Stopper

1) With the flywheel assembly 1, since the torsional angle stopper 30 is provided, too much torque is prevented from being inputted to the elastic member in the flywheel assembly directly outputting torque to the input shaft of the transmission.

2) The torsional angle stopper 30 has a simple structure made up of the first projections 26 and the second projections 29. The first projections 26 and the second projections 29 have simple structures such that the plate-shape cross-sections contact with each other in the rotational direction. Since the first projections 26 and the second projections 29 project in the radial direction, downsizing in the axial direction can be accomplished.

3) Since the first projections 26 of the pair of disk-like plates 11 and 12 respectively contact with each other in the axial direction to define the single stopper part, the strength of the stopper part improves.

4) Since the pair of disk-like plates 11 and 12 have the same shapes, the type of the disk-like plate decreases and the cost of manufacturing is reduced.

5) Since the rivets 13 are disposed in the fixing portion made up of the first projections 26 and the outer portions 25 corresponding thereto, the rivets 13 can be further radially inwardly disposed compared to the conventional product. Accordingly, the damper mechanism 3 and thus the flywheel assembly 1 can be downsized in the radial direction.

In addition, with the conventional fixing portion, since the outer portion of the disk-like plate has been configured to contact further radially outward of the outer periphery edge of the flange, the rivets have been permitted to be sufficiently radially inwardly disposed.

(6) Operation of Friction Generating Mechanism

Figure 7:
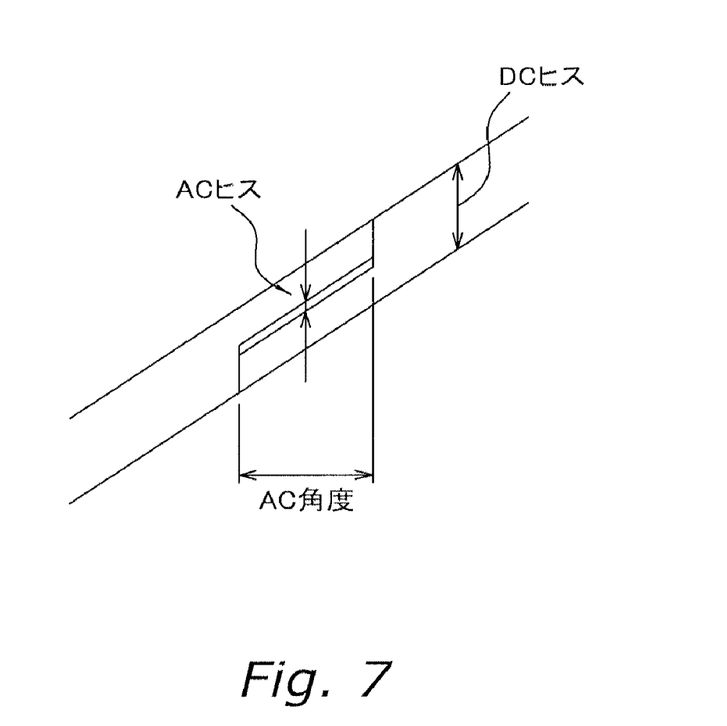
FIG. 7 is a torsional characteristic diagram of the flywheel assembly (first embodiment)

The relative rotation between the plates 11, 12 and the flange 20 causes the coil springs 16, 17 to be compressed in the rotational direction. Moreover, the first bush 51 slides with the flange 20 in the low friction generating mechanism 50, and the second bush 56 slides with the plate 59 in the high friction generating mechanism 55. Accordingly, both of the low friction generating mechanism 50 and the high friction generating mechanism 55 operate, and DC hysteresis torque is obtained as shown in FIG. 7.

Since the third bush 58 and the plate 59 of the high friction generating mechanism 55 rotates relative to the flange 20 in the range of the clearance 61 (AC angle), the third bush 58 and the plate 59 do not slide with the plates 11 and 12 with respect to the small torsional vibrations. That is to say, in the range which the projections 58d of the third bush 58 do not collide with the hole 20d of the flange 20, the third bush 58 and the plate 59 generate friction with respect to the small torsional vibrations. Accordingly, although the low friction generating mechanism 50 operates, the high friction generating mechanism 55 does not operate, so that AC hysteresis torque is obtained as shown in FIG. 7.

In this embodiment, AC hysteresis torque can be adjusted by changing the first bush 51 (material) or the first disc spring 52 (pressing load). That is to say, since the low friction generating mechanism 50 and the high friction generating mechanism 55 are independent from each other (the different urging members are used), changing the AC hysteresis torque does not affect the setting of the DC hysteresis torque.

(7) Second Embodiment

Figure 8:
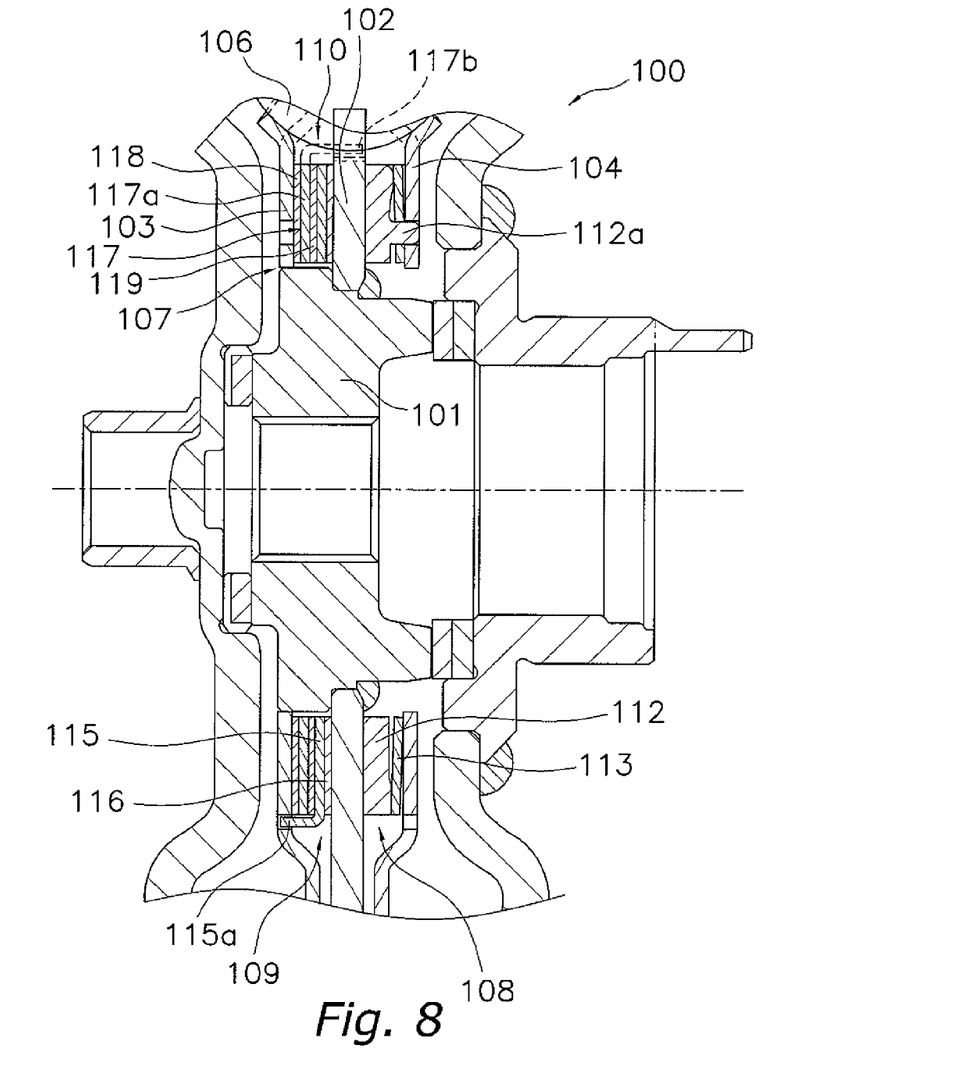
FIG. 8 is a longitudinal cross-sectional view of the flywheel assembly (second embodiment)
Figure 9:
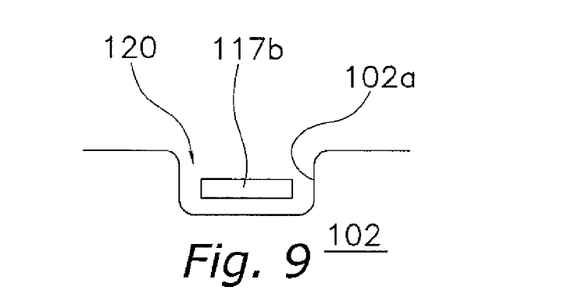
FIG. 9 is a plane view of the flange (second embodiment)
Figure 10:
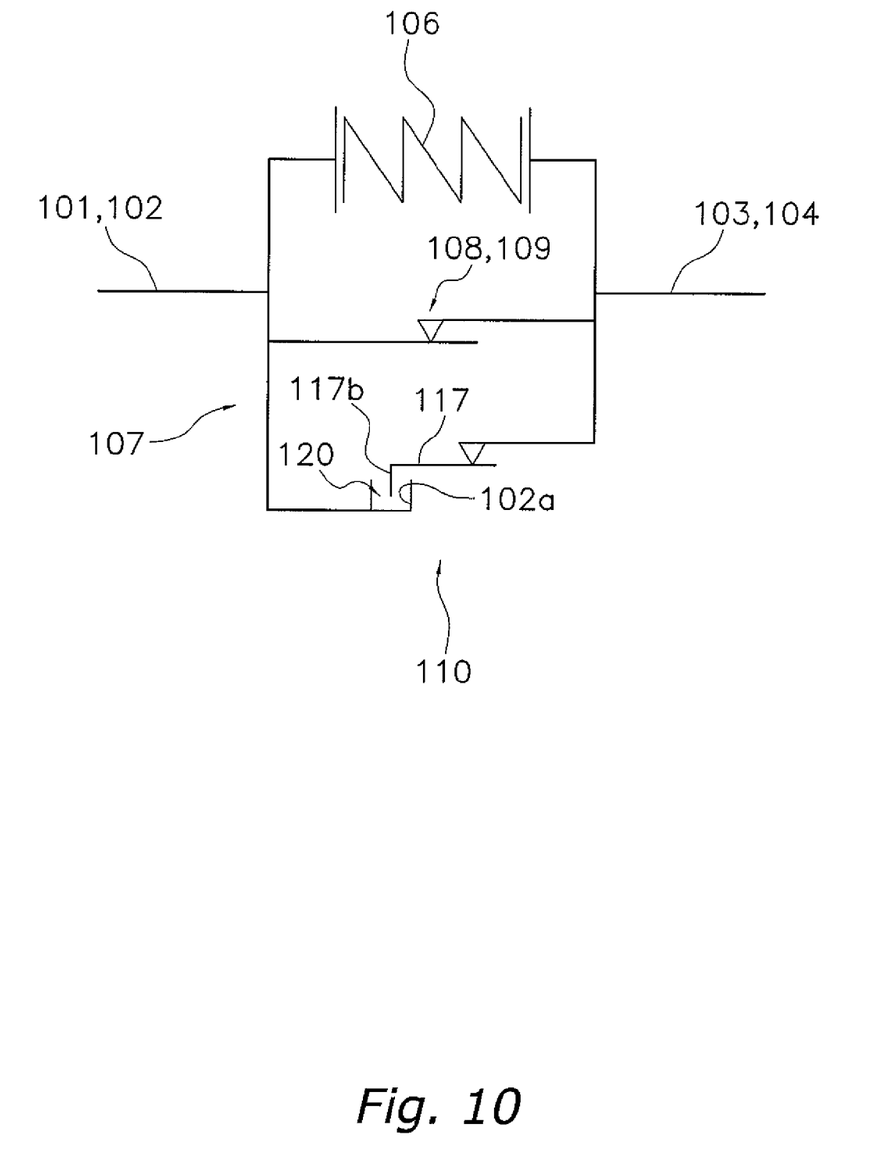
FIG. 10 is a torsional characteristic diagram of the flywheel assembly (second embodiment).

With reference to FIGS. 8 to 10, a flywheel assembly 100 according to the second embodiment of the present invention will be described.

The flywheel assembly 100 includes a hub 101, the flange 102 fixed thereto, a pair of plates 103 and 104 serving as the input member, and a coil springs 106 for coupling elastically the flange 102 and the plate 103 and 104 in the rotational direction.

The friction generating mechanism 107 made up of the plurality of plates and the springs is disposed in the clearance between the inner portion of the plate 103 and 104 and the inner portion of the flange 102. The friction generating mechanism 107 is a mechanism for generating predetermined friction, that is hysteresis torque, when the plates 103 and 104 and the flange 102 relatively rotate.

The friction generating mechanism 107 has a low friction generating mechanisms 108, 109 and a high friction generating mechanism 110. The low friction generating mechanisms 108 and 109 are disposed in parallel with the coil springs 106 between the flange 102 and the plate 103, 104 in the rotational direction, and is a mechanism for constantly generating low friction during operation of the damper mechanism.

The low friction generating mechanism 108 has a first bush 112 and a first disc spring 113. The first bush 112 is disposed between the flange 102 and the plate 104 in the axial direction, and contacts with the axial transmission side surface of the flange 102. The first bush 112 engages to be movable in the axial direction and to be non-movable in the rotational direction relative to the plate 104. Specifically, the first bush 112 has projections 112a extending from the body and engaging with the holes of the plate 104. The first disc spring 113 is compressed between the plate 104 and the first bush 112 in the axial direction, and urges the first bush 112 toward the flange 102. The low friction generating mechanism 109 has a first friction plate 115 and a friction member 116. The first friction plate 115 is disposed on the axial engine side of the flange 102, and the friction member 116 is bonded on the flange 102 side of the first friction plate 115. The first friction plate 115 engages to be movable in the axial direction and to be non-movable in the rotational direction relative to the plate 103. Specifically, the first friction plate 115 has projections 115a extending from the body and engaging with the hole of the plate 103.

The high friction generating mechanism 110 is disposed in parallel with the spring 106 between the flange 102 and the plate 103 and 104 in the rotational direction, is a mechanism that generates a high amount of friction during the operation of the damper mechanism and does not generate the high amount of friction with respect to the small torsional vibrations. The high friction generating mechanism 110 is disposed between the plate 103 and the first friction plate 115 in the axial direction, and has a second friction plate 117, a first friction member 118 and a second friction member 119 bonded to the opposite axial side surfaces of the body 117a. The first friction member 118 contacts with the axial transmission side surface of the plate 103, and the second friction member 119 contacts with the axial engine side surface of the first friction plate 115.

Window openings accommodating the spring 106 are formed with the flange 102, and as shown in FIG. 9, cutouts 102a extending in the axial direction are formed at the inner peripheral edge of the window openings. The second friction plate 117 has a plurality of projections 117b axially extending from the outer periphery edge of the body 117a toward the transmission and extending inside the cutouts 102a. As shown in FIG. 9, since the projections 117b are formed to be smaller than the cutouts 102a, a small clearance 120 is secured between the projections 117b and the cutouts 102a in the rotational direction.

As described above, the second friction plate 117 and the first and second friction member 118 and 119 are disposed to operate in parallel with the coil springs 106 between the plates 103, 104 and the flange 102 in the rotational direction. The second friction plate 117 and the first and second friction member 118 and 119 frictionally engage with the plate 103 and the first friction plate 115, and engage with the flange 102 to be respectively rotatable in only the range of the small torsional angle.

Torque from the crankshaft of the engine is transmitted in the order of the flywheel (not shown), the disk-like plate 103 and 104, the coil springs 106, the flange 102, the hub 101. For example, when the combustion fluctuations of the engine are inputted to the flywheel assembly 100, the disk-like plates 103, 104 and the hub 101 relatively rotate, and the coil springs 106 are repeatedly compressed. At the same time, the friction generating mechanism 107 generates friction (described hereinafter). As a result, in the damper mechanism of the flywheel assembly 100, torsional vibrations are sufficiently absorbed and damped.

The relative rotation between the plates 103, 104 and the flange 102 causes the coil springs 106 to be compressed in the rotational direction. Moreover, the first bush 112 and the friction member 116 slide with the flange 102 in the low friction generating mechanisms 108 and 109, and the second friction member 119 slides with the first friction plate 115. Accordingly, since both of the low friction generating mechanism 108, 109 and the high friction generating mechanism 110 operate, four friction surfaces exist.

Since the second friction plate 117 of the high friction generating mechanism 110 rotates relative to the flange 102 in the range of the clearance 120 (AC angle), the second friction plate 117 does not slide with the plates 103 and 104 with respect to the small torsional vibrations. That is to say, in the range in which the projections 117b of the second friction plate 117 do not collide with the cutouts 102a of the flange 102, the first and second friction member 118 and 119 do not generate friction with respect to the small torsional vibrations. Accordingly, since the low friction generating mechanism 108 and 109 operate and the high friction generating mechanism 110 does not operate, two friction surfaces exist.

(7) Other Embodiments

The present invention is not limited to the embodiments given above, and various modifications and revisions are possible without departing from the gist of the invention. The present invention is a torsional vibration damping apparatus arranged in the power transmitting system of the vehicle having the internal combustion, and is made up of at least one input portion driven by the internal combustion, at least one output portion coupled to the transmission, and a torsional vibration damping device arranged between the input and output portions.

For example, the present invention can be applied in the structure which the hub and the flange are separated and are coupled low rigidity by the elastic member having the low rigidity in the rotational direction.

INDUSTRIAL APPLICABILITY

With the damper disk assembly and the flywheel assembly according to the present invention, since a high amount of friction is not generated with respect to the small torsional vibrations, the small torsional vibrations are effectively damped. Accordingly, the present invention is useful in the field of the torque transmitting device in which the small torsional vibrations are generated.

The invention claimed is:

1. A damper disk assembly comprising:
    a pair of first and second plate-like rotating members being fixed to each other;
    a third plate-like rotating member being disposed between the pair of first and second plate-like rotating members in an axial direction;
    an elastic member coupling the pair of first and second plate-like rotating members and the third plate-like rotating member in the rotational direction; and
    a friction plate being disposed to operate in parallel with the elastic member between the pair of first and second plate-like rotating members and the third plate-like rotating member in the rotational direction, the friction plate frictionally engaging with the pair of first and the second plate-like rotating members, and engaging with the third plate-like rotating member to be relatively rotatable only in a torsional angle,
    the torsion angle being in a range between 0.1 to 5 degrees relative to an axis of rotation of the damper disk assembly.

2. The damper disk assembly according to claim 1, wherein
    the third plate-like rotating member includes a hole penetrating in the axial direction, and
    the friction plate includes a body disposed between the second plate-like rotating member and the third plate-like rotating member in the axial direction, and a projection disposed in the hole to secure a clearance in the rotational direction.

3. The damper disk assembly according to claim 2, further comprising
    a friction member engaging with the first plate-like rotating member to be non-rotatable and axially movable relative thereto and having a friction surface on the projection side, and
    an urging member urging the friction member toward the projection.

4. The damper disk assembly according to claim 3, further comprising
    a plate-like member attached to an end of the projection to be non-rotatable, wherein
    the friction member is pressed against the plate-like member.

5. The damper disk assembly according to claim 4, wherein
    the friction plate positions the first and second plate-like rotating members with respect to each other in the radial direction.

6. The damper disk assembly according to claim 4, wherein
    the friction plate includes a cylindrical portion having an outer periphery surface with which an inner periphery edge of the second plate-like rotating member contacts and an inner periphery surface contacting with an outer periphery surface of the first plate-like rotating member.

7. The damper disk assembly according to claim 3, wherein
    the friction plate positions the first and second plate-like rotating members with respect to each other in the radial direction.

8. The damper disk assembly according to claim 3, wherein
    the friction plate includes a cylindrical portion having an outer periphery surface with which an inner periphery edge of the second plate-like rotating member contacts and an inner periphery surface contacting with an outer periphery surface of the first plate-like rotating member.

9. The damper disk assembly according to claim 2, wherein
    the friction plate positions the first and second plate-like rotating members with respect to each other in the radial direction.

10. The damper disk assembly according to claim 2, wherein
    the friction plate includes a cylindrical portion having an outer periphery surface with which an inner periphery edge of the second plate-like rotating member contacts and an inner periphery surface contacting with an outer periphery surface of the first plate-like rotating member.

11. The damper disk assembly according to claim 1, wherein
    the friction plate positions the first and second plate-like rotating members with respect to each other in the radial direction.

12. The damper disk assembly according to claim 1, wherein
    the friction plate includes a cylindrical portion having an outer periphery surface with which an inner periphery edge of the second plate-like rotating member contacts and an inner periphery surface contacting with an outer periphery surface of the first plate-like rotating member.

13. A flywheel assembly for transmitting torque from a crankshaft of an engine to an input shaft of a transmission, the flywheel assembly comprising:
    a flywheel to which torque is inputted from the crankshaft; and
    a damper disk assembly including a damper mechanism and a friction generating mechanism,
    the damper mechanism including
        a pair of plate-like rotating members being fixed to each other and coupling to the flywheel,
        a hub having a flange being disposed between the pair of plate-like rotating members in an axial direction, the hub outputting torque to the input shaft, and
        an elastic member being compressed in the rotational direction when the pair of plate-like rotating members and the flange relatively rotate, and
    the friction generating mechanism which generates friction when the pair of plate-like rotating members and the flange relatively rotate and does not generate friction with respect to torsional vibrations in a torsional angle, the torsion angle being in a range between 0.1 to 5 degrees relative to an axis of rotation of the damper disk assembly,
    the friction generating mechanism is disposed to operate in parallel with the elastic member between the pair of plate-like rotating members and the flange in the rotational direction, and includes a friction plate engaging with one of the pair of plate-like rotating members and the flange, and engaging with the other of them being relatively rotatable in only the range of the torsional angle.

* * * * *

UNITED STATES PATENT AND TRADEMARK OFFICE
CERTIFICATE OF CORRECTION

| | | |
|---|---|---|
| PATENT NO. | : 8,167,728 B2 | Page 1 of 1 |
| APPLICATION NO. | : 11/916517 | |
| DATED | : May 1, 2012 | |
| INVENTOR(S) | : Michitomo Masaki et al. | |

It is certified that error appears in the above-identified patent and that said Letters Patent is hereby corrected as shown below:

Title Page, please change the listing of [75] from

[75] Inventors: Michimoto Masaki, Neyagawa (JP); Takeshi Harada, Shijyonawate (JP); Hiroshi Uehara, Hirakatashi Osaka (JP)

to

-- [75] Inventors: Michitomo Masaki, Neyagawa (JP); Takeshi Harada, Shijyonawate (JP); Hiroshi Uehara, Hirakatashi Osaka (JP) --

Signed and Sealed this
Twenty-fourth Day of July, 2012

David J. Kappos
*Director of the United States Patent and Trademark Office*